United States Patent [19]
Kwon et al.

[11] Patent Number: 5,811,541
[45] Date of Patent: Sep. 22, 1998

[54] CARBOXYMETHYL-ETHERIFIED STARCH DERIVATIVES AND PROCESS FOR PREPARING THE SAME

[75] Inventors: Sang Gi Kwon, Pusan-shi; Yang Rae Cho, Seoul; Chan Hun Park, Pucheon-shi; Chul Jong Ko, Ansan-shi, all of Rep. of Korea

[73] Assignee: Tae Kyung Co., Ltd., Anyang-shi, Rep. of Korea

[21] Appl. No.: 799,839

[22] Filed: Feb. 13, 1997

[30] Foreign Application Priority Data

Feb. 16, 1996 [KR] Rep. of Korea .................. 3923/1996

[51] Int. Cl.$^6$ ............................ C08B 31/00; C08B 31/08
[52] U.S. Cl. ............................................. 536/102; 536/111
[58] Field of Search ..................................... 536/102, 111

[56] References Cited

U.S. PATENT DOCUMENTS

| | | | |
|---|---|---|---|
| 2,599,620 | 6/1952 | Filbert ..................... | 536/111 |
| 2,609,368 | 9/1952 | Gaver ...................... | 536/111 |
| 2,682,535 | 6/1954 | Broderick ................. | 536/111 |
| 2,845,417 | 7/1958 | Kesler et al. ............. | 536/111 |
| 4,837,314 | 6/1989 | Eastman ................... | 536/111 |
| 5,166,336 | 11/1992 | Yamauchi et al. ......... | 536/124 |

FOREIGN PATENT DOCUMENTS 3-146502  6/1991  Japan .
3-146503  6/1991  Japan .

*Primary Examiner*—Nathan M. Nutter
*Attorney, Agent, or Firm*—Jacobson, Price, Holman & Stern, PLLC

[57] ABSTRACT

Novel carboxymethyl-etherified starch derivatives and methods for manufacturing the same, and more particularly, to the novel carboxymethyl-etherified starch derivatives having a viscosity in 5% aqueous solution of 15~600 cps, when measured by a viscometer of the Hakke rotary type; a permeability in 0.1% aqueous solution of more than 95% at 623 nm, when measured by a UV spectrophotometer; viscosity values at a maximum temperature of 95° C. and at a temperature cooled to 50° C. of 6~304 BU and 6~720 BU, respectively when measured by a Brabender viscometer. The cool water-soluble carboxymethyl-etherified starch derivatives are prepared by the following steps: starches (such as corn, potato, wheat and rice are dissolved in organic solvents, such as, lower alcohol without hydrolysis, or hydrolyzed in the presence of inorganic acids, such as, hydrochloric acid or sulfuric acid at 25° to 75° C. for 30 minutes to 72 hours. Then, with the addition of an etherifying agent, in the presence of alkali, some organic solvent of lower alcohol is further added to the mixture and reacted. The reactant was neutralized, purified with organic solvents and dried to give the desired product.

3 Claims, 7 Drawing Sheets

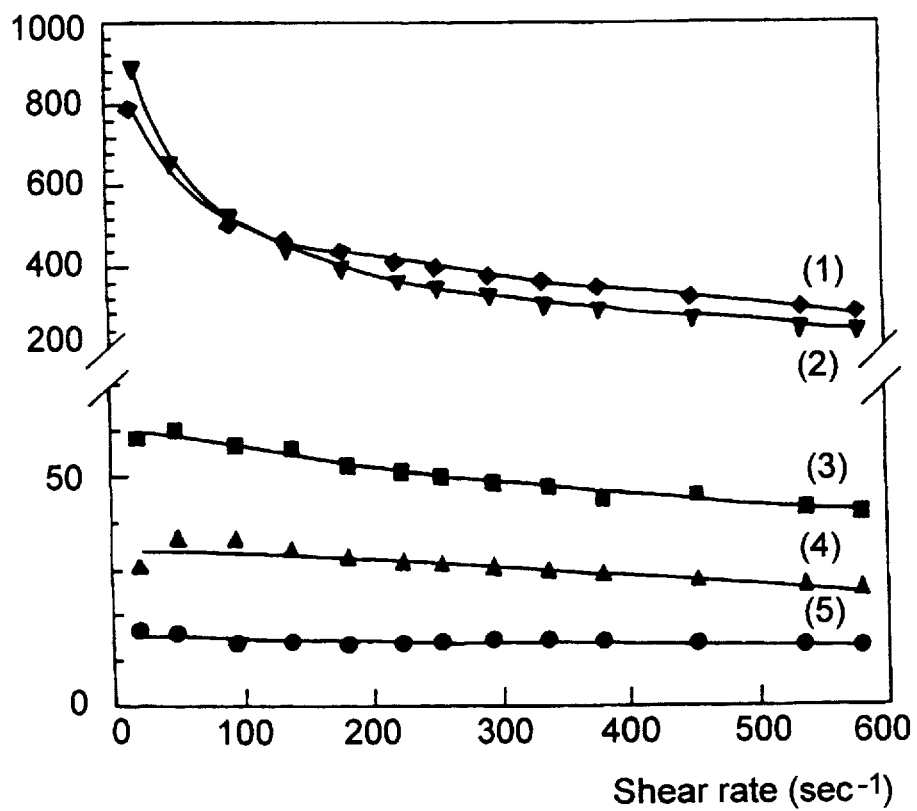

CARBOXYMETHYL-ETHERIFIED STARCH DERIVATIVES AND PROCESS FOR PREPARING THE SAME

FIELD OF THE INVENTION

This invention relates to novel carboxymethyl-etherified starch derivatives and its manufacturing method and more particularly, to the novel carboxymethyl-etherified starch derivatives and its manufacturing method, wherein its viscosity in 5% aqueous solution is 15~600 cps, when measured by a viscometer of the Hakke rotary type; permeability in 0.1% aqueous solution shows more than 95% in 625 nm, when measured by UV spectrophotometer; viscosity values at the maximum temperature of 95° C. and at the temperature cooled to 50° C. are 6~304 BU and 6~720 BU, respectively when measured by a Brabender viscometer.

DESCRIPTION OF THE RELATED ART

In general, etherified or esterified starch derivatives have been used as an enhancer and stabilizer for viscosity in the foods industry; a carrier designed to manufacture dyestuff and dyeing agents in the crude dyeing industry. Further said derivatives are being widely used in other industries such as papers, pharmaceuticals, etc. The starch derivatives include methylated starch, ethylated starch, hydroxyethyl starch, hydroxypropyl starch, carboxymethyl starch, starch formate, starch acetate, starch hydroxypropylpropionate, and starch butylate. Said starch derivatives, showing a relatively high viscosity in 10 to 20% aqueous solution have a poor transparency and when exposed at room temperature, their weak resistance to microorganisms may give rise to the formation of mold. In addition, since there are a wide gap of viscosities between the maximum temperature of 95° C. and cooled temperature of 50° C., when measured by Brabender viscometer, said starch derivatives are weak in resistance to aging when they are cooled after the increase in temperature.

In U.S. Pat. No. 4,837,314 a method of manufacturing hydroxypropyl starch with low viscosity of less than 15,000 cps (Brookfield viscometer, 20 rpm) at relatively high concentration (10% aqueous solution) has been disclosed. However, since highly inflammable propylene oxide have to be employed as an etherifying agent in the manufacturing process, special care should be exercised for the prevention of explosion in the actual production.

In the Japanese Kokai Patent Nos. 91-146502 and 91-146503 which refer to the manufacture of carboxymethyl-etherified salts of starch having the average degree of substitution of more than 0.2 through the reaction of sweet potato or corn starch with alkali in the presence of aqueous solution of etherifying agent, another method of manufacturing carboxymethyl-etherified salts of sweet potato starch having the average degree of substitution of more than 0.2 has been also disclosed. According to said conventional method, more than 7 moles of water as reaction medium should be used to 1 mole of sweet potato starch. Even though the degree of substitution is good, larger facility should be established due to the requirement of a lot of water in the manufacturing process and with more complicated re-processes involved in pulverizing, neutralizing and purifying the molding, the transparency proves to be poor.

SUMMARY OF THE INVENTION

To be free from the aforementioned shortcomings, the object of this invention is to provide cool water-soluble carboxymethyl-etherified starch derivatives, characterized in that; said starch derivatives in 10 to 20% aqueous solution may have low viscosity, said starch derivatives in low concentration may have high viscosity, the transparency of said starch derivatives in 0.1% aqueous solution has more than 95%, when measured by UV spectrophotometer, said starch derivatives have a resistance to microorganisms, said starch derivatives, in heating and cooling, have a strong resistance to aging.

According to this invention, the cool water-soluble carboxymethyl-etherified starch derivatives are prepared in the following steps: Some starches (e.g., corn, potato, wheat and rice) as the main materials are dissolved in organic solvents such as lower alcohol without hydrolysis, or hydrolyzed in the presence of inorganic acids such as hydrochloric acid or sulfuric acid at 25° to 75° C. for 30 minutes to 72 hours. Then, with the addition of etherifying agent in the presence of alkali, some organic solvent such as lower alcohol was further added to the mixture for reaction thereof. The reactant was neutralized, purified with organic solvents and dried to give the cool water-soluble carboxymethyl-etherified starch derivatives.

According to this invention, the lower alcohol presents lower alcohols of $C_1$–$C_3$, includes methanol, ethanol or isopropyl alcohol while using caustic soda (NaOH) or KOH as alkali. The etherifying agent presents etherifying agents having one functional group, includes lower alkylhalides of $C_1$–$C_4$, lower alkyldisulfates of $C_1$–$C_4$, lower alkylene oxides, halogenated lower carboxylic acids and its salts. Further more specifically, said halides include methyl chloride or ethyl chloride, disulfates include dimethylsulfate or diethylsulfate, oxides include ethylene oxide or propylene oxide, carboxylic acid or its salts include monochloroacetic acid, bromoacetic acid or its alkali metal salts. Among them, monochloroacetic acid is the most preferable in embodying this invention.

In the conventional preparation method, because less than 40 parts by weight of the etherifying agent was added to 100 parts by weight of the starch, the starch derivatives had limited resistance to microorganisms and to aging and flexibility as well as transparency. According to the conventional method, the etherifying agent was used in less than 40 parts by weight because when 40 parts or more of the etherifying agent were added, gel was formed during the reaction which made it difficult to proceed with the reaction.

In the present invention, in order to add 40 parts by weight or more of the etherifying agent, the aqueous solution of NaOH must be added to the mixture of the etherifying agent and the starch in the presence of methanol or ethanol at a temperature of 30° C. or below. The temperature is then raised up to proceed with the reaction. The mixture is then neutralized, purified and dried. When the temperature is raised above 30° C., gel is formed and thereby the reaction is difficult to proceed.

The cool water-soluble carboxymethyl-etherified starch derivatives manufactured in accordance with this invention are characterized in that;—the case of 0.1% aqueous solution of said derivatives measured by UV spectrophotometer in 625 nm, its permeability shows more than 95%,—the case of 5% aqueous solution of said derivatives measured by a viscometer of the Hakke rotary type, its viscosity ranges 15~600 cps, and when measured by Brabender viscometer, the viscosity is 6~304 BU at the maximum temperature of 95° C. and 6~720 BU at the cooled temperature,—The case of 5~20% aqueous solution of said derivatives, its long-term storage testing at room temperature (25° C.) for 6 months revealed the resistance against bacteria.

Compared with the conventional carboxymethyl-etherified starch derivatives, therefore, it is well understood that the carboxymethyl-etherified starch derivatives of this invention are superior in terms of transparency, viscosity, bacteria-resistance and aging.

BRIEF DESCRIPTION OF THE DRAWINGS

FIG. 7 is a viscograph showing the test results on Examples 1, 4, 5, 6 of this invention and Pullulan of comparative example 1 in 5% aqueous solution, when measured by a viscometer of the Hakke rotary type.

This invention is explained in more detail by the following examples.

EXAMPLE 1

500 g of potato starch was dissolved in 755 ml of methanol and with the addition of 248.2 g of monochloroacetic acid (ClCH$_2$COOH), the mixture was stirred for one hour. Then, a solution containing 312 g of caustic soda dissolved in 428.5 g of water was added to said mixture and stirred at 37° C. for 50 minutes. The reactant was neutralized, purified with 85% methanol and dried to give a dried product (1).

Figure 1:
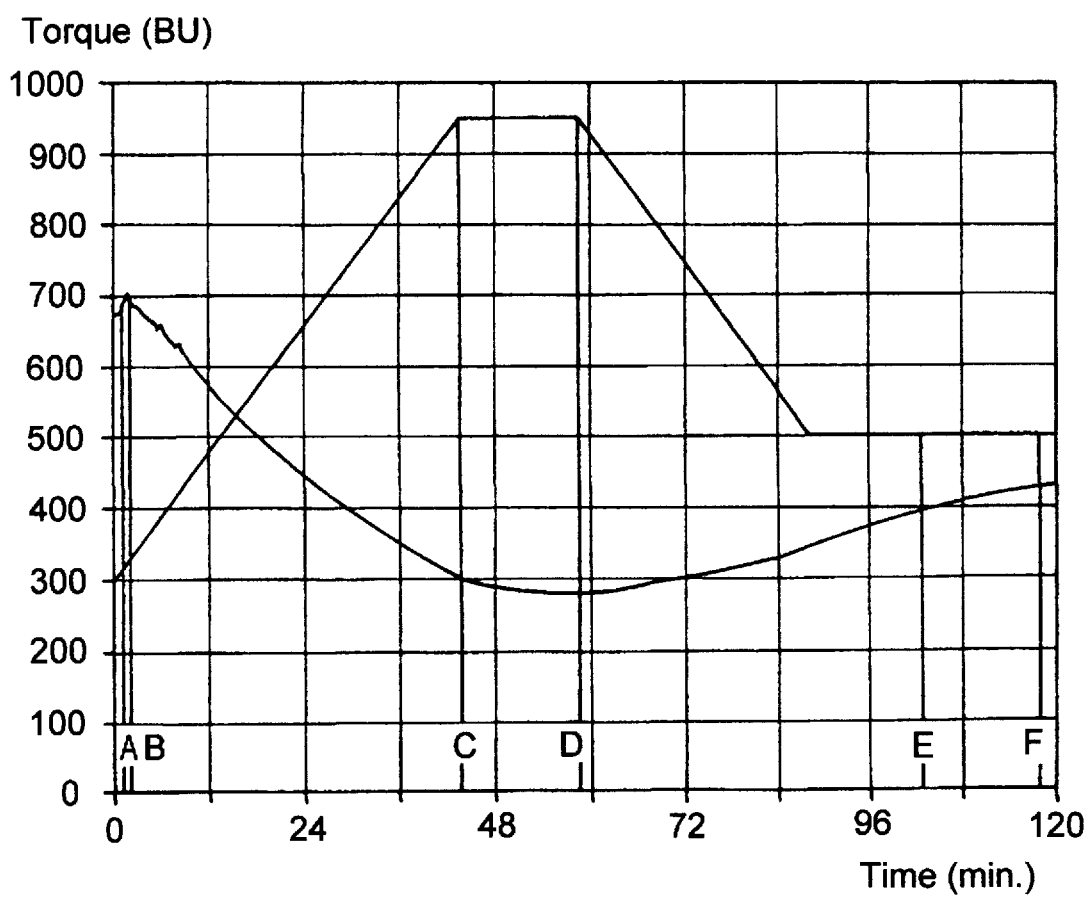
FIG. 1 is a viscograph in which starch derivatives, manufactured according to Example 1 of this invention, are measured a Brabender viscometer.

As shown in FIG. 1, the test results of 0.1% aqueous solution of said dried product (1), so prepared, revealed that transparency measured by UV spectrophotometer was 96.5% in 625 nm. Further the test results of 5% aqueous solution were as follows:—Viscosity was 500 cps at the shear rate of 150 sec$^{-1}$, when measured by a viscometer of the Hakke rotary type;—Formation of bacteria was not detected from the long-term storage testing at room temperature (25° C.) for 6 months;—Viscosities at the madximum temperature of 95° C. and a temperature cooled to 50° C. were 304 BU and 430 BU, respectively when measured by a Brabender viscometer.

The test conditions and their evaluation of FIG. 1 are as follows:

| 1) Test conditions | | | |
|---|---|---|---|
| Moisture: | 18.0 [%] | Correction: | 14.0 [%] |
| Corr. to 14%: | 20.0 [g] | Sample weight: | 20.0 [g] |
| Corr. to 14%: | 399.1 [ml] | Water: | 400.0 [ml] |
| Speed: | 70 [r/min] | Meas. range: | 1000 [cmg] |
| Start temp.: | 30 [°C.] | Heat/cool rate: | 1.5 [°C./min] |
| Max. temp.: | 95 [°C.] | Up. hold time: | 15 [min] |
| End temp.: | 50 [°C.] | Fin. hold time: | 15 [min] |

| 2) Evaluation | | | | |
|---|---|---|---|---|
| Point | Name | Time [MM:SS] | Torque [BU] | Temp. [°C.] |
| A | Beginning of gelatinization | 1:00 | 685.0 | 31.5 |
| B | Maximum viscosity | 2:00 | 703.0 | 33.0 |
| C | Start of holding period | 43:15 | 304.0 | 95.0 |
| D | Start of cooling period | 58:15 | 279.0 | 95.0 |
| E | End of cooling period | 102:30 | 393.0 | 50.0 |
| F | End of final holding period | 117:45 | 430.0 | 50.0 |

EXAMPLE 2

500 g of corn starch was hydrolyzed with 0.5N-hydrochloric acid at 25° C. for 30 minutes and with the addition of 205 g of monochloroacetic acid and 1180 ml of methanol as solvent, the mixture was stirred for one hour. Then, a solution of caustic soad containing 189 ml of caustic soda dissolved in 400 ml of water was added to said mixture and stirred at 50° C. for 2.5 hours. The reactant was neutralized, purified with 90% methanol and dried to give a dried product (2).

0.1% aqueous solution of said dried product (2) was prepared and its transparency measured based upon the same method as described in Example 1 was 95.1% in 625 nm. Further the test results of 5% aqueous solution which was left for 6 months revealed that there was no formation of bacteria.

EXAMPLE 3

500 g of potato starch was hydrolyzed with 4N-hydrochloric acid at 50° C. for 45 minutes and with the addition of 250 g of monochloroacetic acid and 1328 ml of ethanol as solvent, the mixture was stirred for one hour and twenty mintus. Then, 245 g of caustic soda was added to said mixture and stirred at room temperature for 3 hours. The reactant was neutralized, purified with 75% methanol and dried to give a dried product (3).

0.1% aqueous solution of said dried product (3) was prepared and its transparency measured based upon the same method as described in Example 1 was 95.6% in 625 nm. Further the test results of 5% aqueous solution which was left for 6 months revealed that there was no formation of bacteria.

EXAMPLE 4

500 g of potato starch was hydrolyzed with 3N-hydrochloric acid at 25° C. for 30 minutes and with the addition of 248 g of monochloroacetic acid and 1250 ml of ethanol as solvent, the mixture was stirred for 1.5 hours. Then, a solution of caustic soda containing 275 g of caustic soda dissolved in 612 ml of water was added to said mixture and stirred at 60° C. for 2 hours. The reactant was neutralized, purified with 90% methanol and dried to give a dried product (4).

Figure 2:
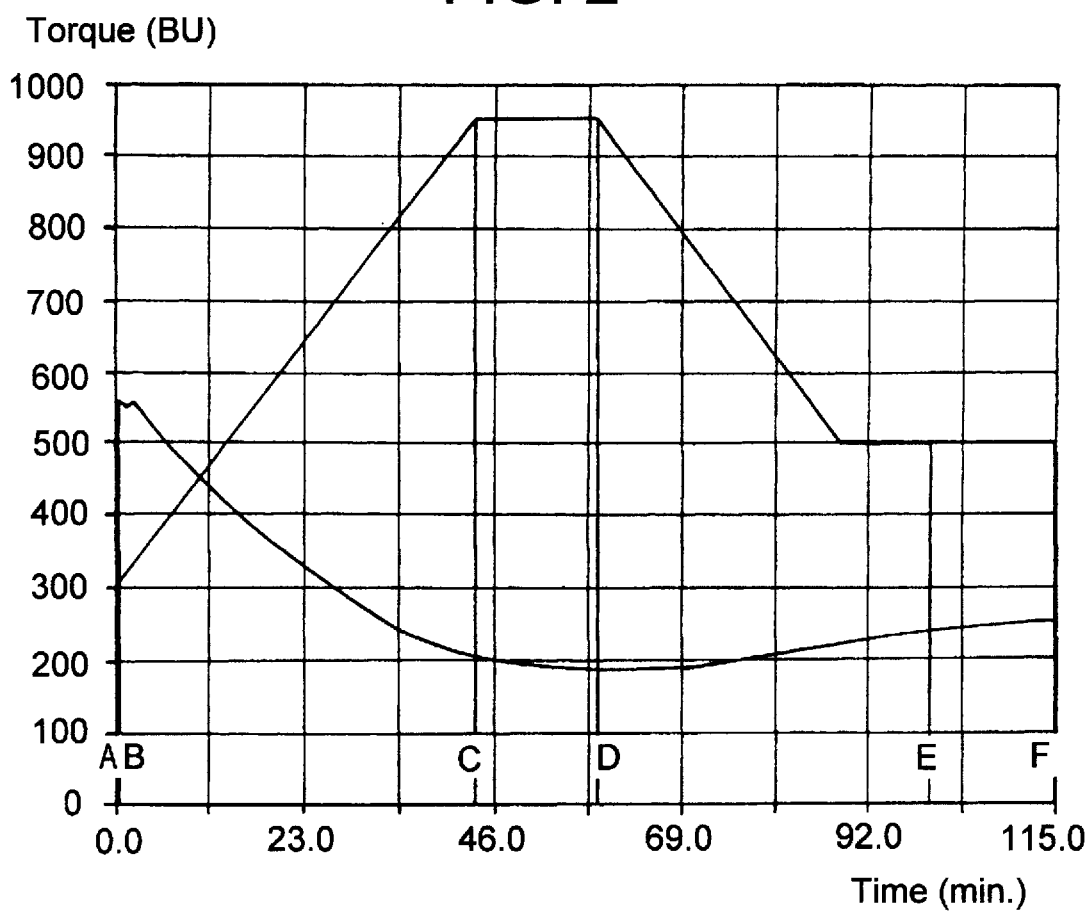
FIG. 2 is a viscograph in which starch derivatives, manufactured according to Example 4 of this invention, are measured by a Brabender viscometer.

As shown in FIG. 2, the test results of 0.1% aqueous solution of said dried product (4), so prepared, revealed that transparancy based upon the same method as described in Example 1 was 98.2%. Further the test results of 5% aqueous solution were as follows:—Viscosity was 500 cps at the shear rate of 150 sec$^{-1}$, when measured by a viscometer of the Hakke rotary type;—Formation of bacteria was not detected from the long-term storage testing at room temperature (25° C.) for 6 months;—Viscosity values at 30° C., 95° C. and at a temperature cooled again to 50° C. were 562 BU, 207.0 BU and 254 BU, respectively when measured by a Brabender viscometer.

The test conditions and their evaluation of FIG. 2 are as follows:

1) Test conditions

| | | | |
|---|---|---|---|
| Moisture: | 18.0 [%] | Correction: | 14.0 [%] |
| Corr. to 14%: | 15.7 [g] | Sample weight: | 15.0 [g] |
| Corr. to 14%: | 299.2 [ml] | Water: | 300.0 [ml] |
| Speed: | 70 [r/min] | Meas. range: | 1000 [cmg] |
| Start temp.: | 30 [°C.] | Heat/cool rate: | 1.5 [°C./min] |
| Max. temp.: | 95 [°C.] | Up. hold time: | 15 [min] |
| End temp.: | 50 [°C.] | Fin. hold time: | 15 [min] |

2) Evaluation

| Point | Name | Time [MM:SS] | Torque [BU] | Temp. [°C.] |
|---|---|---|---|---|
| A | Beginning of gelatinization | 0:15 | 561.0 | 30.4 |
| B | Maximum viscosity | 0:30 | 562.0 | 30.8 |
| C | Start of holding period | 43:15 | 207.0 | 95.0 |
| D | Start of cooling period | 58:15 | 193.0 | 95.0 |
| E | End of cooling period | 99:15 | 241.0 | 50.0 |
| F | End of final holding period | 114:30 | 254.0 | 50.0 |

EXAMPLE 5

500 g of potato starch was hydrolyzed with 5N-hydrochloric acid at room temperature for 72 hours and with the addition of 248 g of monochloroacetic acid and 1280 ml of ethanol as solvent, the mixture was stirred for 1 hour. Then, 200 g of caustic soda was added to said mixture and stirred at 45° C. for 2 hours. The reactant was neutralized, purified with 80% methanol and dried to give a dried product (5).

Figure 3:
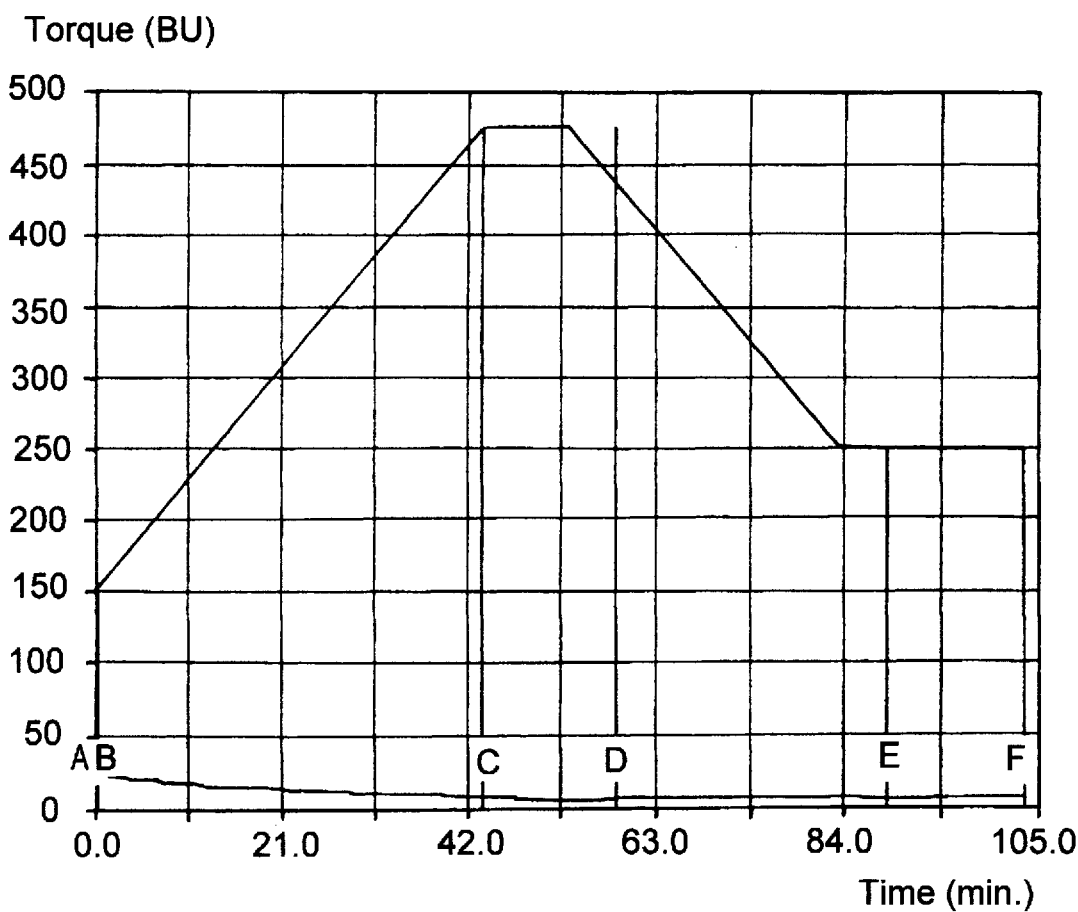
FIG. 3 is a viscograph in which starch derivatives, manufactured according to Example 5 of this invention, are measured by a Brabender viscometer.

As shown in FIG. 3, the test results of 0.1% aqueous solution of said dried product (5), so prepared, revealed that transparency based upon the same method as described in Example 1 was 96.9%. Further the test results of 5% aqueous solution were as follows:—Formation of bacteria was not detected from the long-term storage testing for 6 months;—Viscosity values at 30° C., 95° C. and 50° C. were 23 BU, 7 BU and 6 BU, respectively when measured by a Brabender viscometer.

The test conditions and their evaluation of FIG. 3 are as follows:

1) Test conditions

| | | | |
|---|---|---|---|
| Moisture: | 18.0 [%] | Correction: | 14.0 [%] |
| Corr. to 14%: | 15.7 [g] | Sample weight: | 15.0 [g] |
| Corr. to 14%: | 299.2 [ml] | Water: | 300.0 [ml] |
| Speed: | 70 [r/min] | Meas. range: | 1000 [cmg] |
| Start temp.: | 30 [°C.] | Heat/cool rate: | 1.5 [°C./min] |
| Max. temp.: | 95 [°C.] | Up. hold time: | 10 [min] |
| End temp.: | 50 [°C.] | Fin. hold time: | 20 [min] |

2) Evaluation

| Point | Name | Time [MM:SS] | Torque [BU] | Temp. [°C.] |
|---|---|---|---|---|
| A | Beginning of gelatinization | 0:15 | 23.0 | 30.4 |
| B | Maximum viscosity | 0:15 | 23.0 | 30.4 |
| C | Start of holding period | 43:15 | 7.0 | 95.0 |
| D | Start of cooling period | 58:15 | 5.0 | 95.0 |
| E | End of cooling period | 88:15 | 6.0 | 50.0 |
| F | End of final holding period | 103:15 | 7.0 | 50.0 |

EXAMPLE 6

500 g of potato starch was hydrolyzed with 2.8N-hydrochloric acid at 40° C. for 40 minutes and with the addition of 355 g of monochloroacetic acid and 2500 ml of ethanol as solvent, the mixture was stirred for one hour and 25 minutes. Then, a solution of caustic soda containing 295 g of caustic soda dissolved in 613 ml of water was added to said mixture and stirred at 70° C. for 2 hours. The reactant was neutralized, purified with 90% methanol and dried to give a dried product (6).

As shown in table 4, the test results of 0.1% aqueous solution of said dried product (6), so prepared, revealed that transparency based upon the same method as described in Example 1 was 96.5%. Further the test results of 20% aqueous solution were as follows:—Formation of bacteria was not detected from the long-term storage testing for 6 months;—Viscosity values at 30° C., 95° C. and 50° C. were 18 BU, 8 BU and 6 BU, respectively when measured by a Brabender viscometer. The difference of viscosity from 95° C. to 50° C. is 2 BU.

Figure 4:
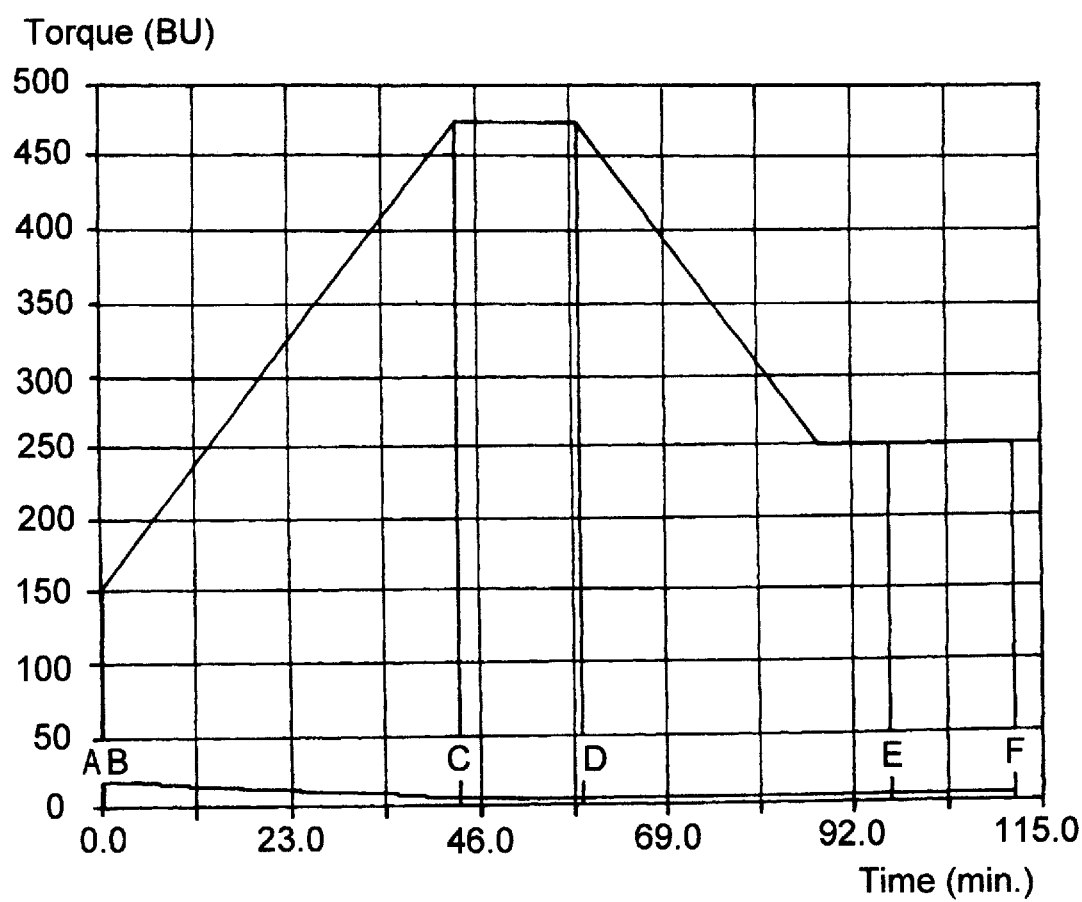
FIG. 4 is a viscograph in which starch derivatives, manufactured according to Example 6 of this invention, are measured by Brabender viscometer.

The test conditions and their evaluation of FIG. 4 are as follows:

1) Test conditions

| | | | |
|---|---|---|---|
| Moisture: | 18.0 [%] | Correction: | 14.0 [%] |
| Corr. to 14%: | 15.7 [g] | Sample weight: | 15.0 [g] |
| Corr. to 14%: | 299.2 [ml] | Water: | 300.0 [ml] |
| Speed: | 70 [r/min] | Meas. range: | 1000 [cmg] |
| Start temp.: | 30 [°C.] | Heat/cool rate: | 1.5 [°C./min] |
| Max. temp.: | 95 [°C.] | Up. hold time: | 15 [min] |
| End temp.: | 50 [°C.] | Fin. hold time: | 15 [min] |

2) Evaluation

| Point | Name | Time [MM:SS] | Torque [BU] | Temp. [°C.] |
|---|---|---|---|---|
| A | Beginning of gelatinization | 0:15 | 18.0 | 30.4 |
| B | Maximum viscosity | 0:15 | 18.0 | 30.4 |
| C | Start of holding period | 43:15 | 8.0 | 95.0 |
| D | Start of cooling period | 58:15 | 6.0 | 95.0 |
| E | End of cooling period | 96:15 | 6.0 | 50.0 |
| F | End of final holding period | 111:30 | 6.0 | 50.0 |

COMPARATIVE EXAMPLE 1

Figure 5:
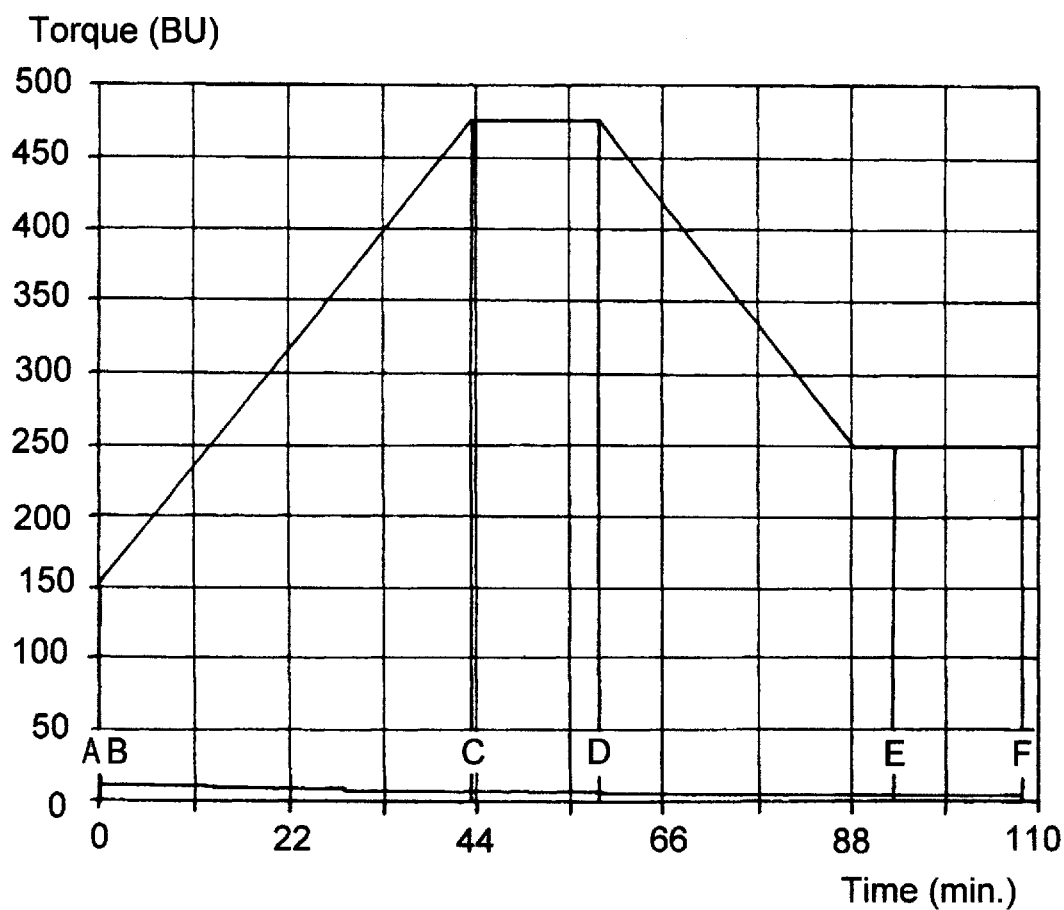
FIG. 5 is a viscograph in which Pullulan, a well-known substance, is measured by a Brabender viscometer.

As shown in FIG. 5, the viscosity values of Pullulan (Hayashibara, Japan) containing non-carboxymethyl starch derivatives, which was purchased from the local market, were measured by a Brabender viscometer; 10 BU at the initial temperature of 30° C., 78 BU at 95° C. and 6 BU at 80° C.

The test conditions and their evaluation of FIG. 5 are as follows:

1) Test conditions

| | | | |
|---|---|---|---|
| Moisture: | 18.0 [%] | Correction: | 14.0 [%] |
| Corr. to 14%: | 20.9 [g] | Sample weight: | 20.0 [g] |

-continued

| | | | |
|---|---|---|---|
| Corr. to 14%: | 399.1 [ml] | Water: | 400.0 [ml] |
| Speed: | 70 [r/min] | Meas. range: | 1000 [cmg] |
| Start temp.: | 30 [°C.] | Heat/cool rate: | 1.5 [°C./min] |
| Max. temp.: | 95 [°C.] | Up. hold time: | 15 [min] |
| End temp.: | 50 [°C.] | Fin. hold time: | 15 [min] |

2) Evaluation

| Point | Name | Time [MM:SS] | Torque [BU] | Temp. [°C.] |
|---|---|---|---|---|
| A | Beginning of gelatinization | 0:15 | 10.0 | 30.4 |
| B | Maximum viscosity | 0:15 | 10.0 | 30.4 |
| C | Start of holding period | 43:15 | 7.0 | 95.0 |
| D | Start of cooling period | 58:15 | 7.0 | 95.0 |
| E | End of cooling period | 92:45 | 6.0 | 50.0 |
| F | End of final holding period | 108:00 | 6.0 | 50.0 |

COMPARATIVE EXAMPLE 2

Figure 6:
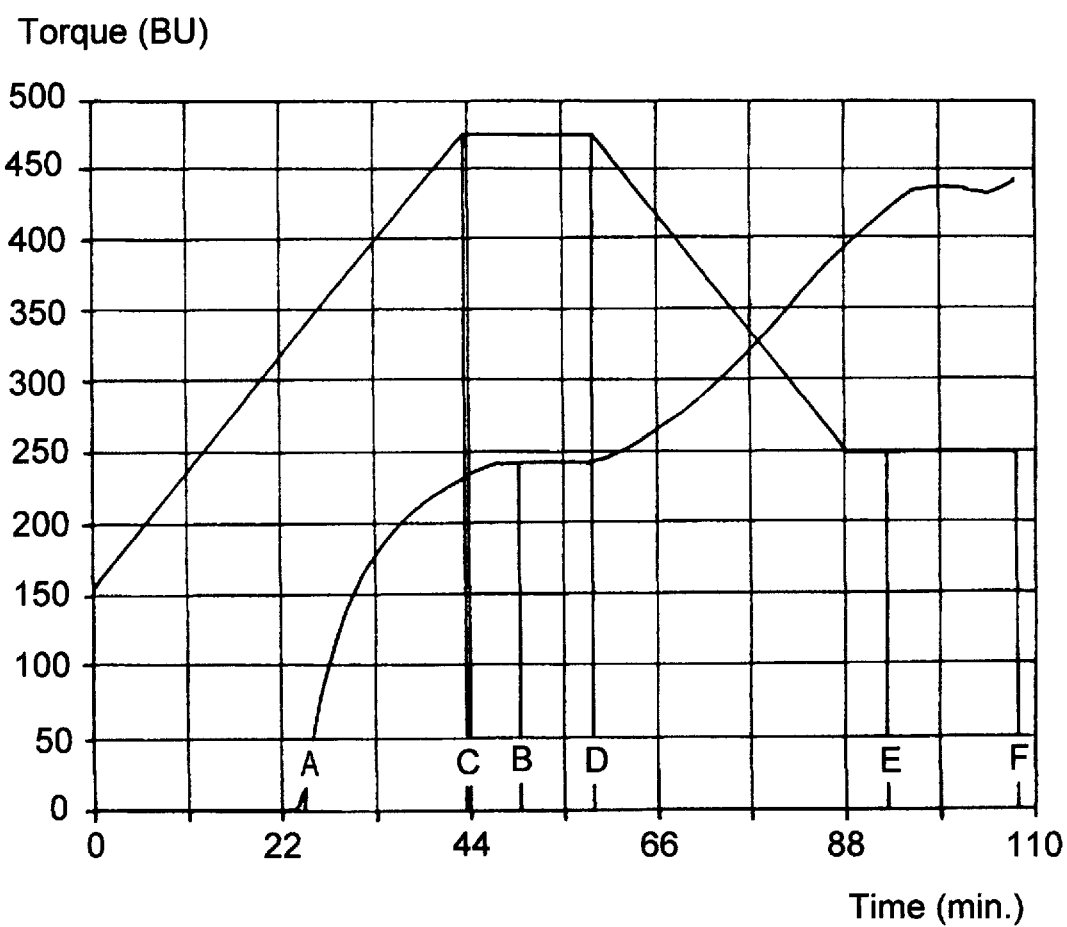
FIG. 6 is a viscograph in which potato starch is measured by a Brabender viscometer.

As shown in FIG. 6, the viscosity values of potato starch raw materials, which were purchased from the local market, were measured by a Brabender viscometer; 243 BU at 95° C. and 419 BU at 80° C.

The test conditions and their evaluation of FIG. 6 are as follows:

1) Test conditions

| | | | |
|---|---|---|---|
| Moisture: | 18.0 [%] | Correction: | 14.0 [%] |
| Corr. to 14%: | 20.9 [g] | Sample weight: | 20.0 [g] |
| Corr. to 14%: | 399.1 [ml] | Water: | 400.0 [ml] |
| Speed: | 70 [r/min] | Meas. range: | 1000 [cmg] |
| Start temp.: | 30 [°C.] | Heat/cool rate: | 1.5 [°C./min] |
| Max. temp.: | 95 [°C.] | Up. hold time: | 15 [min] |
| End temp.: | 50 [°C.] | Fin. hold time: | 15 [min] |

2) Evaluation

| Point | Name | Time [MM:SS] | Torque [BU] | Temp. [°C.] |
|---|---|---|---|---|
| A | Beginning of gelatinization | 24:45 | 14.0 | 67.1 |
| B | Maximum viscosity | 50:00 | 243.0 | 95.0 |
| C | Start of holding period | 43:15 | 233.0 | 95.0 |
| D | Start of cooling period | 58:15 | 243.0 | 95.0 |
| E | End of cooling period | 92:30 | 419.0 | 50.0 |
| F | End of final holding period | 107:45 | 442.0 | 50.0 |

For reference FIG. 7 is a viscograph showing the test results on Examples 1, 4, 5, 6 of this invention and Pullulan of comparative example 1 in 5% aqueous solution, which is measured by a viscometer in Hakke rotary type.

From the aforementioned tests, it is well understood that the cool water-soluble carboxymethyl-etherified starch derivatives manufactured in accordance with this invention are characterized in that;—In the case of 0.1% aqueous solution of said derivatives measured by UV spectrophotometer in 623 nm, its permeability shows more than 95%,—In the case of 5% aqueous solution of said derivatives measured by a viscometer of the Hakke rotary type, its viscosity ranges between 15~600 cps, and when measured by a Brabender viscometer, the viscosity is 6~304 BU at the maximum temperature of 95° C. and 6~720 BU at the cooled temperature of 50° C.,—In the case of 5~20% aqueous solution of said derivatives, its long-term storage testing at room temperature (25° C.) for 6 months revealed the resistance against bacteria.

Now the carboxymethyl-etherified starch derivatives of this invention in relatively high concentration of 10~20% aqueous solution may be freely controlled in any level of viscosity, that is, from the high concentration and low viscosity to the low concentration and high viscosity. Various kinds of starch derivatives of the invention having the extended solubilities of 1%, 5%, 10%, 20% and 30% and having a property of from the relatively low concentration and high viscosity to the high concentration and low viscosity, may be widely applied in the industrial fields involved.

What is claimed is:

1. Carboxymethyl-etherified starch derivatives which are soluble in 20°–25° C. water, said derivatives having a viscosity of 15–600 cps in 5% aqueous solution when measured by a Hakke rotary-type viscometer, a transparency of more than 95% transmittance in a form of 0.1% aqueous solution when measured by a UV spectrophotometer at 625 nm, and a viscosity of 6–304 BU at 95° C. and a viscosity of 6–720 BU when cooled to 50° C. when measured by a Brabender viscometer.

2. A process for preparing the carboxymethyl-etherified starch derivatives of claim 1, said process comprising the steps of:

(a) preparing a mixture by adding an etherifying agent of at least 40 parts by weight of the mixture to a starch of 100 parts by weight of the mixture, said starch selected from the group consisting of corn starch, potato starch, wheat starch and rice starch, either without hydrolysis or hydrolyzed in the presence of HCl or $H_2SO_4$, in the presence of methanol or ethanol;

(b) adding an aqueous solution of NaOH to the mixture prepared in step (a) at a temperature of 30° C. or below;

(c) then, raising the temperature of the mixture prepared in step (b); and (d) neutralizing, purifying and drying the mixture prepared in step (c).

3. The process of claim 2, wherein the etherifying agent is monochloroacetic acid.

* * * * *